(12) United States Patent
Green et al.

(10) Patent No.: US 12,504,400 B2
(45) Date of Patent: Dec. 23, 2025

(54) ION MOBILITY SEPARATION

(71) Applicant: Micromass UK Limited, Wilmslow (GB)

(72) Inventors: Martin Raymond Green, Bowdon (GB); Jason Lee Wildgoose, Stockport (GB); Steven Derek Pringle, Darwen (GB); Keith Richardson, High Peak (GB); Kevin Giles, Stockport (GB)

(73) Assignee: Micromass UK Limited, Wilmslow (GB)

( * ) Notice: Subject to any disclaimer, the term of this patent is extended or adjusted under 35 U.S.C. 154(b) by 416 days.

(21) Appl. No.: 18/006,526

(22) PCT Filed: Jul. 23, 2021

(86) PCT No.: PCT/GB2021/051909
§ 371 (c)(1),
(2) Date: Jan. 23, 2023

(87) PCT Pub. No.: WO2022/018457
PCT Pub. Date: Jan. 27, 2022

(65) Prior Publication Data
US 2023/0349859 A1    Nov. 2, 2023

(30) Foreign Application Priority Data
Jul. 24, 2020 (GB) .................................. 2011470

(51) Int. Cl.
*G01N 27/623* (2021.01)
*G01N 27/624* (2021.01)
(Continued)

(52) U.S. Cl.
CPC ......... *G01N 27/623* (2021.01); *G01N 27/624* (2013.01); *H01J 49/0031* (2013.01); *H01J 49/0045* (2013.01); *H01J 49/4215* (2013.01)

(58) Field of Classification Search
CPC .. G01N 27/623; G01N 27/624; G01N 27/622; H01J 49/0031; H01J 49/0045; H01J 49/4215; H01J 49/004; H01J 49/421
See application file for complete search history.

(56) References Cited

U.S. PATENT DOCUMENTS 8,173,959 B1    5/2012  Boumsellek et al.
9,646,813 B2 *  5/2017  Bateman ............... H01J 49/004
(Continued)

FOREIGN PATENT DOCUMENTS

GB    2562690 A    11/2018
GB    2564749 A    1/2019

OTHER PUBLICATIONS

Search Report for United Kingdom Patent Application No. GB2011470. 8, mailed Apr. 8, 2021.
(Continued)

*Primary Examiner* — David A Vanore
(74) *Attorney, Agent, or Firm* — Goodwin Procter LLP

(57) ABSTRACT

An instrument for analysing ions is disclosed comprising: a first device (4) configured to onwardly transmit ions having a restricted range of physicochemical property values at any given time, and to change said range with time such that the first device (4) is capable of transmitting ions having different physicochemical property values at different times; and an ion mobility separator (6) arranged to receive ions transmitted by the first device (4); wherein the instrument is configured such that the time that any given ion enters the ion mobility separator (6) and begins to be separated from other ions is defined by its time of transmission by the first device.

19 Claims, 7 Drawing Sheets

(51) Int. Cl.
    *H01J 49/00*     (2006.01)
    *H01J 49/42*     (2006.01)

(56) References Cited

U.S. PATENT DOCUMENTS

| | | | | |
|---|---|---|---|---|
| 10,090,146 | B2* | 10/2018 | Green | G01N 27/623 |
| 10,586,691 | B2* | 3/2020 | Hoyes | H01J 49/421 |
| 10,697,932 | B2* | 6/2020 | Wildgoose | H01J 49/0045 |
| 11,049,709 | B2* | 6/2021 | Giles | H01J 49/004 |
| 12,080,534 | B2* | 9/2024 | Wildgoose | G01N 27/623 |
| 2002/0014586 | A1 | 2/2002 | Clemmer | |
| 2005/0040330 | A1 | 2/2005 | Kaufman et al. | |
| 2009/0194688 | A1 | 8/2009 | Bateman et al. | |
| 2010/0108878 | A1 | 5/2010 | Bateman et al. | |
| 2012/0273669 | A1 | 11/2012 | Ivashin et al. | |
| 2016/0274058 | A1* | 9/2016 | Wildgoose | G01N 27/623 |
| 2016/0274059 | A1* | 9/2016 | Hoyes | H01J 49/40 |
| 2016/0282305 | A1* | 9/2016 | Green | H01J 49/0027 |
| 2016/0320340 | A1* | 11/2016 | Giles | G01N 27/622 |
| 2017/0003250 | A1* | 1/2017 | Green | H01J 49/0404 |
| 2017/0011899 | A1* | 1/2017 | Moulds | H01J 49/0036 |
| 2017/0069475 | A1* | 3/2017 | Brown | H01J 49/0031 |
| 2017/0125234 | A1 | 5/2017 | Räther et al. | |
| 2017/0178880 | A1* | 6/2017 | Wildgoose | H01J 49/004 |
| 2017/0276645 | A1* | 9/2017 | Green | H01J 49/004 |
| 2018/0151339 | A1* | 5/2018 | Wildgoose | H01J 49/427 |
| 2018/0366313 | A1* | 12/2018 | Hoyes | H01J 49/061 |
| 2020/0144041 | A1 | 5/2020 | Green et al. | |
| 2023/0296561 | A1* | 9/2023 | Green | G01N 27/623 |
| | | | | 324/464 |
| 2023/0349859 | A1* | 11/2023 | Green | H01J 49/004 |

OTHER PUBLICATIONS

International Search Report and Written Opinion for International Patent Application No. PCT/GB2021/051909, mailed Oct. 26, 2021.
Combined Search and Examination Report for United Kingdom Patent Application No. GB2110609.1, mailed Dec. 20, 2021.
Menlyadiev, M.R., et al., "Tandem Differential Mobility Spectrometry in Purified Air for High-Speed Selective Vapor Detection" Analytical Chemistry, 86(5):2395-2402 (2014).
Combined Search and Examination Report for United Kingdom Patent Application No. GB2408256.2, mailed Jul. 18, 2024.

* cited by examiner

ION MOBILITY SEPARATION

CROSS-REFERENCE TO RELATED APPLICATIONS

This application is a U.S. national phase filing claiming the benefit of and priority to International Patent Application No. PCT/GB2021/051909, filed Jul. 23, 2021, which claims priority from and the benefit of United Kingdom patent application No. 2011470.8 filed on Jul. 24, 2020, the entire contents of which are incorporated herein by reference.

FIELD OF THE INVENTION

The present invention relates generally to ion mobility analysers that separate ions by their mobility, e.g. to determine their ion mobilities by determining their travel time through an ion mobility separation region.

BACKGROUND

In conventional ion mobility separator (IMS) devices the ions are accumulated in an ion trap arranged at the upstream end of an ion separation region. These ions are then pulsed into the separation region and are driven through a background gas arranged therein, such that the ions separate according to their mobilities through the background gas. The ions may be driven through the background gas by a static DC potential gradient, or by repeatedly travelling a DC potential barrier along the separation region. Ions of different mobility exit the IMS device at different times and are detected at a downstream ion detector. The mobility of any given ion can then be determined based on the duration of time between the ions being pulsed into the separation region and the time at which that ion is detected. Alternatively, the IMS device may be used simply to separate ions by mobility, rather that determining the mobilities of the ions.

SUMMARY

The present invention provides an instrument for analysing ions comprising: a first device configured to onwardly transmit ions having a restricted range of physicochemical property values at any given time, and to change said range with time such that the first device is capable of transmitting ions having different physicochemical property values at different times; and an ion mobility separator arranged to receive ions transmitted by the first device; wherein the instrument is configured such that the time that any given ion enters the ion mobility separator and begins to be separated from other ions is defined by its time of transmission by the first device.

Arrangements are known in which a mass filter is provided upstream of an ion mobility separator. However, as far as the inventors are aware, in such conventional arrangements the ions have always been trapped downstream of the mass filter and pulsed into the ion mobility separation region. This trapping and pulsing was considered necessary in order to define the start of the ion mobility separation cycle. In contrast to such arrangements, the inventors of the present invention have recognised that there are advantages in using the operational characteristics of the mass filter itself (or other devices that selectively transmit ions) to define the start time of the ion mobility separation cycle.

The instrument may be configured such that ions are not axially trapped between the first device and the ion mobility separator.

In contrast to conventional ion mobility separators, as embodiments of the present invention do not trap and pulse ions into the ion mobility separation region, the timescales, complexity and duty cycle of the experiments are able to be improved.

The first device may be a mass filter and the physicochemical property may be mass to charge ratio.

The mass filter may be configured to onwardly transmit ions having one or more restricted range of mass to charge ratios at any given time (i.e. within one or more mass transmission windows), and to change the upper and/or lower limits of each said range with time such that the mass filter is capable of transmitting ions having different mass to charge ratios at different times.

For example, the mass filter may be a resolving quadrupole rod set mass filter to which RF and DC voltages are applied such that only ions having a mass to charge ratio, or ratios, within the window are able to be onwardly transmitted. Alternatively, the mass filter may be a notched mass filter to which a broadband AC frequency waveform is applied so as to eject all ions other than those that oscillate at a frequency corresponding to one or more notched portion of the broadband frequency waveform. The single frequency, or frequency range, of each notch therefore defines the mass to charge ratio transmission window of the mass filter.

Alternatively, the physicochemical property may be mass to charge ratio, but the first device may be a mass selective ion trap.

The ion trap may be configured to mass selectively eject and onwardly transmit ions having one or more restricted range of mass to charge ratios at any given time (i.e. within one or more mass to charge ratio ejection windows), and to change the upper and/or lower limits of each said range with time such that the ion trap is capable of ejecting and onwardly transmitting ions having different mass to charge ratios at different times.

Alternatively, the physicochemical property may be ion mobility or differential ion mobility.

The first device may therefore be an ion mobility filter or a differential ion mobility filter, such as a FAIMS device.

The first device may be configured to transmit each range of physicochemical property values for a time period before changing said range that is transmitted, wherein said time period is shorter than the transit time through the ion mobility separator of the highest mobility ion in said range.

The instrument may comprise a mass analyser downstream of the ion mobility separator for mass analysing ions that have been separated by the ion mobility separator, or ions derived therefrom.

The mass analyser may periodically mass analyse ions a plurality of times for each said range of physicochemical property values that is selectively transmitted by the first device. In other words, the mass analyser may mass analyse ions a plurality of times for each separation cycle of the ion mobility separator.

The mass analyser may be a Time of Flight mass analyser such as an orthogonal acceleration time of flight mass analyser. Alternatively, the mass analyser may be a quadrupole rod set mass analyser or another type of mass analyser.

The instrument may comprise an ion detector arranged downstream of the ion mobility separator; wherein the instrument is configured to determine the transit time of any given ion through the ion mobility separator based on the time at which said restricted range of physicochemical property values is changed and the time at which said given ion, or an ion derived therefrom, is subsequently detected at the ion detector.

The ion detector may be the detector of the mass analyser described above.

The instrument may have a processor and electronic circuitry that determines the ion mobility of an ion based on the duration between the first device being changed so as to transmit a new range of physicochemical property values and the time at which the ion (or an ion derived therefrom) is subsequently detected at the ion detector. The instrument may determine the ion mobilities of multiple different ions that are separated in the same ion mobility separation cycle using the time that the first device is changed so as to transmit a new range of physicochemical property values and the times at which different ions are subsequently detected at the ion detector.

The first device defines the time at which ions of any given physicochemical property value enter the ion mobility separator and therefore defines the start time of the ion mobility separation for these ions. This is in contrast to conventional ion mobility analysers, which define the start time of the ion mobility separation by using an ion trap to accumulate and pulse ions into the separation region of the ion mobility separator. Embodiments of the present invention use said first device to provide a start time for the ion mobility separation cycle that is dependent on a physicochemical property value, which enables a more selective analysis than conventional devices and also enables a separation based on both the physicochemical property and ion mobility.

The instrument may be configured to determine the ion mobility or collision cross section of said given ion from said transit time.

The instrument may comprise a mass analyser downstream of the ion mobility separator for determining the mass to charge ratios of the ions it receives, wherein the instrument is configured to record both the mass to charge ratio of each ion and also the transit time or ion mobility of that ion, or of the ion from which it is derived.

The mass to charge ratio and transit time (or ion mobility) for each ion are recorded in a manner such that they are associated with each other.

As the mass spectral data for each ion is recorded such that it is associated with its ion mobility or transit time through the ion mobility separator, the data may be processed (e.g. by a computer processor) so as to resolve ions that overlap in one of ion mobility or mass to charge ratio. Additionally, or alternatively, the data may be processed to determine the charge states of the ions, since the mass to charge ratios and mobilities of ions having a given charge state tend to follow a trend.

The instrument may be configured such that, in a first mode, precursor ions transmitted by the first device are substantially not fragmented or reacted between the first device and the mass analyser or ion detector such that substantially only the precursor ions are detected at the mass analyser or ion detector.

In this mode, the instrument may determine the mass to charge ratios and ion mobilities of the precursor ions. This data may be used, for example, to determine the charge states of the ions. The mass spectral data may then be filtered according to charge state, for example.

The instrument may comprise a fragmentation or reaction device downstream of the ion mobility separator that is configured, in a second mode, to fragment or react at least some of the ions received from the ion mobility separator so as to form fragment or product ions.

In the second mode, precursor ions transmitted by the first device are fragmented or reacted between the first device and the mass analyser or ion detector such that fragment or product ions are detected at the mass analyser or ion detector (along with any remaining unfragmented or unreacted precursor ions).

In this mode, the instrument may determine the mass to charge ratios of the fragment or product ions (and for any remaining precursor ions) as well as optionally determining the ion mobilities of the precursor ions from which they derive.

The instrument may be configured to associate the fragment or product ions with their respective precursor ions, e.g. based on their time of detection and/or based on the ion signal intensity profile of the detected fragment or product ions matching the ion signal intensity profile of any detected unfragmented or unreacted precursor ions.

The instrument may comprise a fragmentation or reaction device between the first device and ion mobility separator that is configured, in a third mode, to fragment or react at least some of the precursor ions it receives from the first device so as to form first fragment or product ions.

The first fragment or product ions, and any remaining unfragmented or unreacted precursor ions, are transmitted into the ion mobility separator and separated according to their mobility.

The first fragment or product ions may be substantially not fragmented or reacted downstream of the ion mobility separator.

Alternatively, the first fragment or product ions may be fragmented or reacted downstream of the ion mobility separator (e.g. in the manner described above in relation to the second mode) so as to form second generation fragment or product ions.

The fragmentation or reaction performed according to the embodiments described herein may be according to any known type of fragmentation or reaction. For example, ions may be fragmented by collision induced dissociation (CID), electron transfer dissociation (ETD), electron capture dissociation (ECD), surface induced dissociation (SID) etc. Ions may be reacted with reagent ions or neutral molecules so as to form different product ions. Where two or more stages of either fragmentation or reaction are performed it is contemplated that the same or different types of fragmentation or reaction may be performed at the different stages. It is alternatively contemplated that fragmentation may be performed at one stage and reaction may be performed at another.

The present invention also provides a method of analysing ions using the instrument described herein.

Accordingly, the present invention provides a method of separating ions according to ion mobility comprising: providing an instrument as described above; controlling the first device so as to onwardly transmit ions having a restricted range of physicochemical property values at any given time; and separating ions that are transmitted by the first device in an ion mobility separator; wherein the first device is controlled so that said range is changed with time such that the first device transmits ions having different physicochemical property values at different times; and wherein the time that any given ion enters the ion mobility separator and begins to be separated from other ions is defined by its time of transmission by the first device.

The step of controlling the first device may comprise applying voltages to electrodes of the first device. Similarly, the step of changing said range may comprise changing one or more voltage applied to at least one electrode of the first device.

The precursor ions transmitted by the first device to the ion mobility separator may not be axially trapped between the first device and the ion mobility separator.

The method may comprise another mode in which it fragments or reacts at least some of the precursor ions transmitted by the first device to form fragment or product ions; and transmits the fragment or product ions, and any remaining precursor ions, to the ion mobility separator without axially trapping any ions between the first device and the ion mobility separator.

The present invention also provides a method of mass spectrometry comprising the method described above, and mass analysing ions downstream of the ion mobility separator.

The present invention also provides a method of ion mobility spectrometry comprising the method described above, detecting ions downstream of the ion mobility separator and determining, from their times of detection, the ion mobilities of ions that were transmitted through the ion mobility separator.

The method may be used to identify and/or quantify an analyte ion.

BRIEF DESCRIPTION OF THE DRAWINGS

Various embodiments will now be described, by way of example only, and with reference to the accompanying drawings in which.

DETAILED DESCRIPTION

Figure 1:
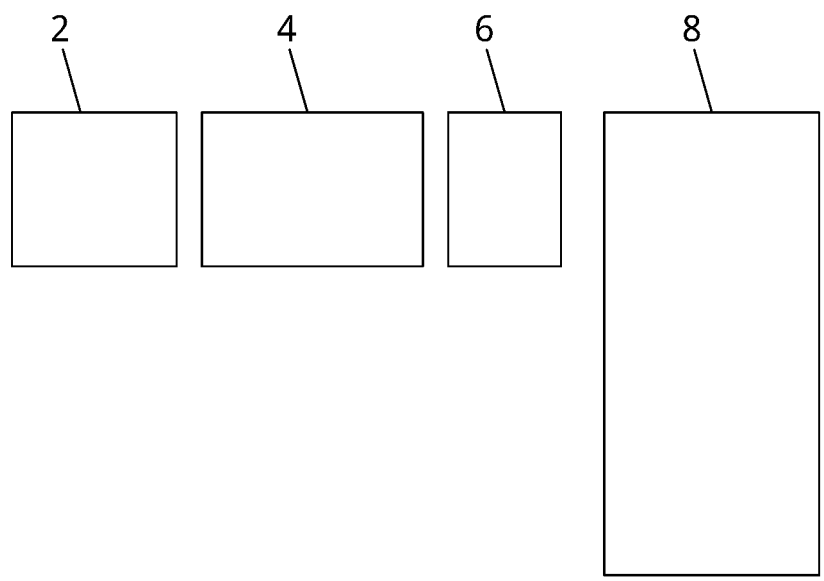
FIG. 1 shows a schematic of an embodiment of the present invention.

FIG. 1 shows a schematic of an embodiment of the present invention comprising an ion source 2, a quadrupole rod set mass filter 4, an ion mobility separator (IMS) 6, and a mass analyser 8.

In operation, ions are generated by ion source 2 and pass to the mass filter 4. Voltages are applied to the mass filter 4 so that it is only capable of transmitting ions within a certain mass to charge ratio transmission window at a given time. Ions having mass to charge ratios outside of this window are filtered out and are not transmitted by the mass filter 4. Accordingly, the mass to charge ratios of the ions that are transmitted by the mass filter 4 may be determined from the voltages that are applied to the mass filter 4 at the time of transmission of the ions (after a suitable calibration procedure to determine the relationship between the applied voltages and the m/z range transmitted). Alternatively, the mass to charge ratios of the ions that are transmitted by the mass filter 4 at any given time may be determined by the mass analyser 8.

The mass to charge ratio transmission window of the mass filter 4 may be scanned with time such that (only) different mass to charge ratios are capable of being transmitted by the mass filter 4 at different times. The voltages applied to the mass filter 4 may be controlled so as to continuously and progressively scan the mass to charge ratio transmission window, or to step the mass to charge ratio transmission window, through different mass to charge ratio values so that the mass filter 4 is capable of transmitting different mass to charge ratios at different times. If the mass to charge ratio transmission window is stepped, then it is paused for a dwell time before being stepped to the next mass to charge ratio transmission position.

Ions that are transmitted by the mass filter 4 pass into the IMS device 6, which separates the ions according to their ion mobility through a separation region of the IMS device 6. The IMS device may be a drift tube IMS device in which a static DC gradient urges the ions through a background gas present in the separation region so as to cause the ions to separate according to their mobility. Alternatively, the IMS device 6 may be a travelling wave IMS device in which one or more DC potential barrier is repeatedly travelled along the separation region of the IMS device 6 so as to urge ions through the background gas therein at different rates depending on the ion mobilities of the ions through that gas (e.g. as described in U.S. Pat. No. 6,791,078, which is incorporated herein). Importantly, the IMS device 6 does not comprise an ion trap that accumulates and pulses ions into the separation region. Rather, the timings at which ions are introduced into the IMS device 6 is controlled by the mass filter 4, as will be described in more detail further below. The ions that elute from the IMS device 6 are transmitted into the mass analyser 8 and are mass analysed and detected, e.g. by a time of flight (TOF) mass analyser.

The IMS device 6 may simply separate the ions by mobility, or the ion mobility of any given ion may be determined from the duration of time that it takes that ion to travel through the IMS device 6. The continuous scanning or stepping of the mass to charge ratio transmission window of the mass filter 4 determines when ions of any given mass to charge ratio are able to enter the IMS device 6, and the mass analyser 8 detects ions that have exited the IMS device 6. As such, the duration of time that it takes an ion to travel through the IMS device 6 may be determined from the time that elapses between the mass transmission window of the mass filter 4 moving to a new mass to charge ratio transmission position and the time at which an ion is subsequently detected in the mass analyser 8. In the embodiments in which the mass transmission window is stepped and held at each mass transmission position for a dwell time, the dwell time is desirably comparable to or less than the diffusion limits that define the resolving power of the IMS device 6, such that the dwell time will not significantly degrade the IMS resolution.

In embodiments in which the mass analyser 8 is a TOF mass analyser, the extraction region of the TOF mass analyser may intermittently push ions into the time of flight region towards the detector at a rate such that it performs a plurality of mass analyses for each separation cycle of the IMS device 6, i.e. a plurality of times before the mass transmission window of the mass filter 4 is moved to transmit another mass to charge ratio. This enables the different elution times of the ions from the IMS device 6 to be detected. The flight times of the ions from the extraction region of the TOF mass analyser to its detector may also be recorded and used to determine the mass to charge ratios of the ions in the normal manner.

Although the mass analyser 8 has been described as being a TOF mass analyser, it may alternatively be another type of mass analyser. For example, the mass analyser 8 may be a quadrupole mass analyser having a quadrupole rod set mass filter followed by an ion detector. In such a mass analyser voltages are applied to the quadrupole rod set mass filter such that it has a mass to charge ratio transmission window that is capable of only transmitting a single mass to charge ratio at any given time, whereas ions having mass to charge ratios outside of this window are filtered out and are not transmitted by the mass filter. The voltages applied to the mass filter are varied with time so as to cause the mass to charge ratio transmission window to be continuously scanned or stepped with time such that (only) different mass to charge ratios are capable of being transmitted by the mass filter at different times. If an ion is detected at the ion detector then the mass to charge ratio of that ion can be determined from the voltages applied to the mass filter at the time that the ion is detected (after a suitable calibration procedure to determine the relationship between the applied voltages and the m/z range transmitted). The mass filter of the mass analyser may be scanned over a range of mass to charge ratios a plurality of times (or stepped between a number of m/z ratios, a plurality of times) for each separation cycle of the upstream IMS device 6, i.e. a plurality of times before the mass transmission window of the mass filter 4 is moved to another mass to charge ratio. Alternatively, in a targeted mode of operation the mass filter may be set to transmit a single m/z region for the duration of the separation cycle of the upstream IMS device 6.

Alternatively, it is contemplated that an ion detector may be provided downstream of the IMS device 6 in order to detect ions for determining their ion mobility, without the ion detector being part of a mass analyser 8. This arrangement may be used in embodiments in which the mass to charge ratio of the ions in not determined downstream of the IMS device 6. For example, the mass to charge ratios of the ions may not be determined, or the mass to charge ratios of the detected ions may be determined from the voltages applied to the mass filter 4 at a time corresponding to when the detected ions would have been transmitted by the mass filter 4.

Although the mass filter 4 has been described as a quadrupole mass filter, it may alternatively be a different type of mass filter or device that mass selectively transmits ions of different mass to charge ratio to the IMS device 6 at different times. For example, the mass filter 4 may be a notched mass filter, e.g. as described in U.S. Pat. No. 8,952,320 which is incorporated herein. In embodiments of the present invention a broadband excitation waveform having a relatively wide range of frequencies at relatively high amplitudes is applied to the electrodes of a quadrupole rod set mass filter 4, but a notch is provided within this range of frequencies at which no excitation frequencies (or only small amplitude frequencies) are applied. This causes the mass filter 4 to eject and filter out all ions having secular frequencies corresponding to the frequencies of the broadband excitation waveform that are not in the notched portion. In contrast, ions having a secular frequency corresponding to the frequency (or small range of frequencies) of the notched portion are onwardly transmitted to the IMS device 6. The frequency at which the notched portion is located is then varied with time so that (only) different mass to charge ratio ions are able to be transmitted by the mass filter 4 at different times.

Alternatively, a mass selective ion trap may be provided instead of the mass filter 4 which mass selectively ejects (only) ions of different mass to charge ratios to the IMS device 6 at different times.

Alternatively, rather than using a mass filter or mass selective ion trap to selectively transmit ions to the IMS device 6, ions may be selectively transmitted according to another physicochemical property. For example, ions may be selectively transmitted to the IMS device 6 according to ion mobility or differential ion mobility. An ion mobility filter or differential ion mobility separator, such as a FAIMS device, may be provided upstream of the IMS device 6. The voltages applied to such an ion mobility filter or differential ion mobility separator may set such that it onwardly transmits ions having a restricted range of ion mobilities or differential ion mobilities at any given time. The voltages may then be varied with time so as to change said restricted range with time such that ions having different ion mobilities or differential ion mobilites are transmitted at different times.

It is contemplated that ions may or may not be fragmented or reacted within the instrument. For example, the ions may be fragmented or reacted to produce fragment or product ions at a location between the mass filter 4 and the IMS device 6. The mass to charge ratio of the parent of any given detected fragment or product ion may be determined from the values of the voltages applied to the mass filter 4 at a time corresponding to when the parent of the fragment of product ion would have been transmitted by the mass filter 4. Each fragment or product ion detected at the mass analyser 8 can therefore be correlated to its respective parent ion. Alternatively, or additionally, ions may be fragmented or reacted in other locations of the instrument, such as upstream of the mass filter 4 and/or downstream of the IMS device 6. It will therefore be appreciated that embodiments may be used to perform multiple reaction monitoring (MRM) experiments.

FIGS. 2A-2F show data obtained according to an embodiment of the present invention.

Figure 2A:
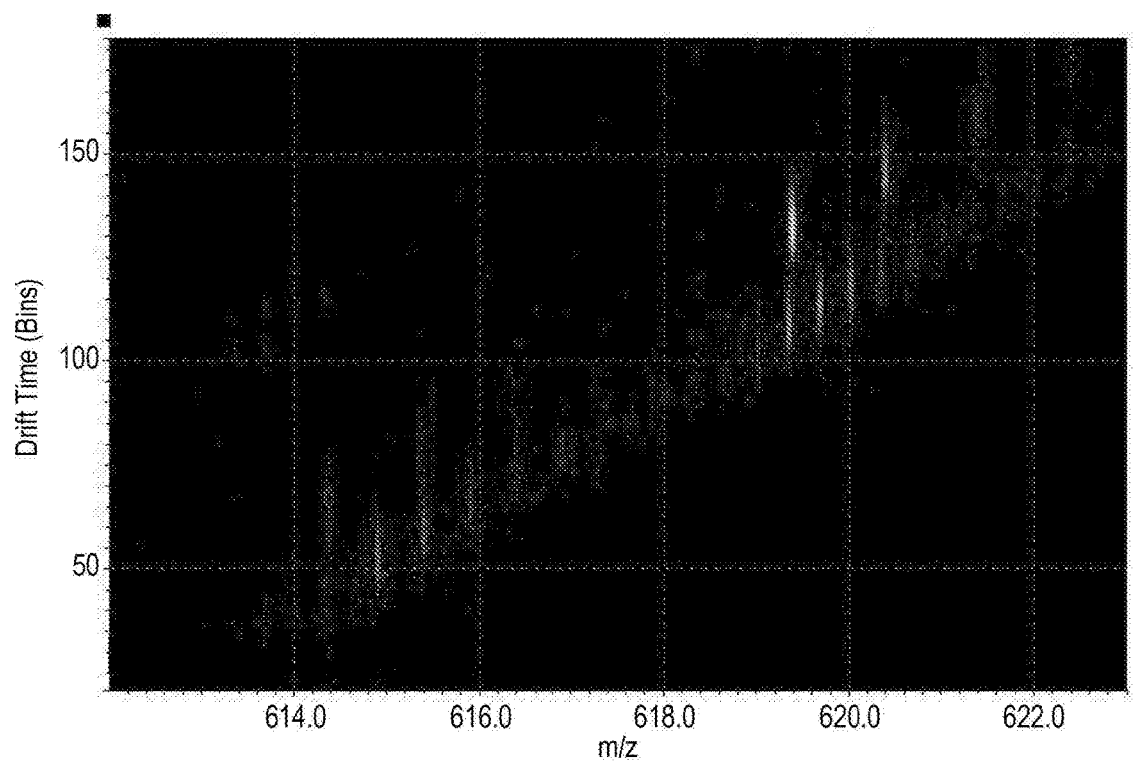
FIGS. 2A-2F show data obtained according to an embodiment of the present invention.

FIG. 2A shows a heat-map plot for an infusion of a simple mixture of peptides. The x-axis represents the mass to charge ratios (m/z) of the ions transmitted by the mass filter 4. The y-axis represents the drift times through the IMS device 6 of the ions detected by the mass analyser 8. The brightness of the points plotted represents the intensity of the ions detected, with brighter points representing more a more intense ion signal. Therefore, the data points in each vertical column of FIG. 2A show the drift times of the ions for each mass to charge ratio transmitted by the mass filter 4.

The data was obtained using a quadrupole mass filter 4 and a travelling wave IMS device 6 arranged downstream of the mass filter 4, wherein the background gas in the IMS device 6 was nitrogen at a pressure of 3 mbar. The quadrupole mass filter 4 had a mass transmission window of ~1 amu and was scanned over a range of mass to charge ratios from m/z=614 to m/z=630 during a 0.1 s period. The mass transmission window of the quadrupole mass filter 4 therefore scanned over each mass to charge ratio value in approximately 6.25 ms (i.e. the 0.1 s scan divided by a mass range of 16). The mass filter 4 therefore allows only ions of one specific mass to charge ratio to enter the IMS device 6 at any given time. The drift time of each ion was then determined from the duration between when the mass transmission window of the mass filter 4 was able to transmit that ion until the time that the ion was detected downstream of the IMS device 6. As the mass transmission window of the mass filter 4 is scanned with time, ions having different mass to charge ratios are only able to enter the IMS device 6 at different times.

Figure 2B:
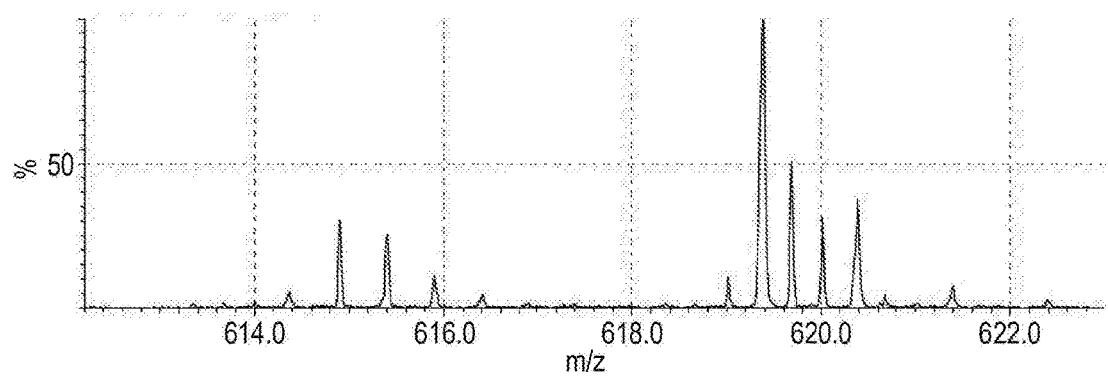

FIG. 2B shows the intensity of the ion signal detected as a function of mass to charge ratio, for the data in FIG. 2A (without showing the drift time data for the ions). Each mass peak that was recorded was recorded over a timescale of ~6.5 ms.

Referring again to FIG. 2A, it can be seen that even when a single mass to charge ratio is transmitted by the mass filter 4, multiple ion mobility peaks are observed. This can be seen from the distribution of the ions detected for each mass to charge ratio along the y-axis and their intensities. Multiple ion mobility peaks may be detected for a single mass to charge ratio because ions having the same nominal mass to charge ratio, but different charge states, have different drift times through the IMS device 6. Ions of different charge states tend to follow different trend lines correlating drift time to mass to charge ratio.

Figure 2C:
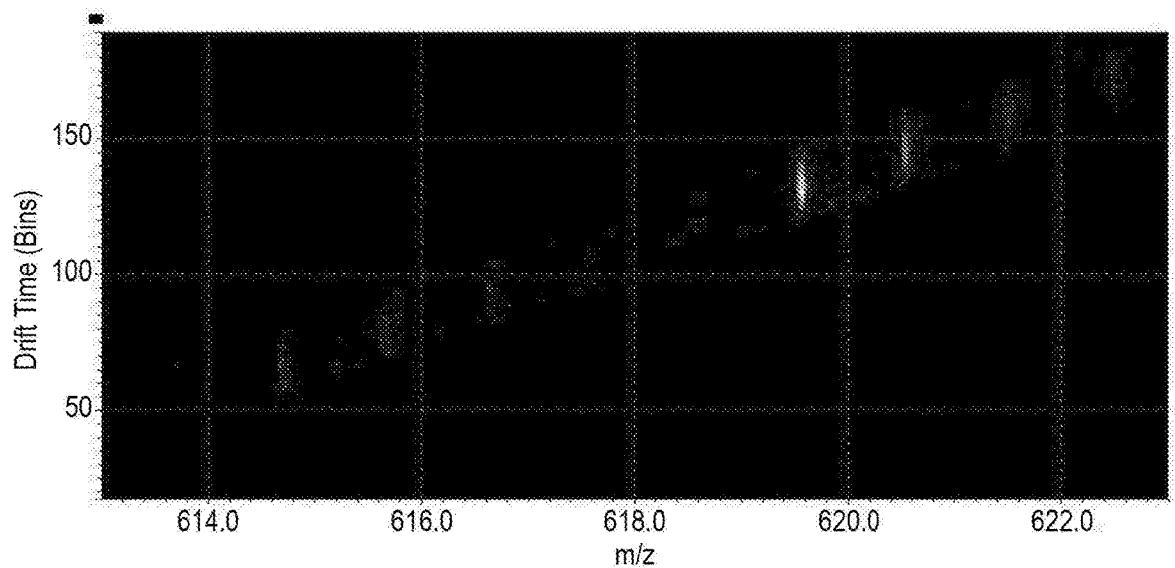
Figure 2D:
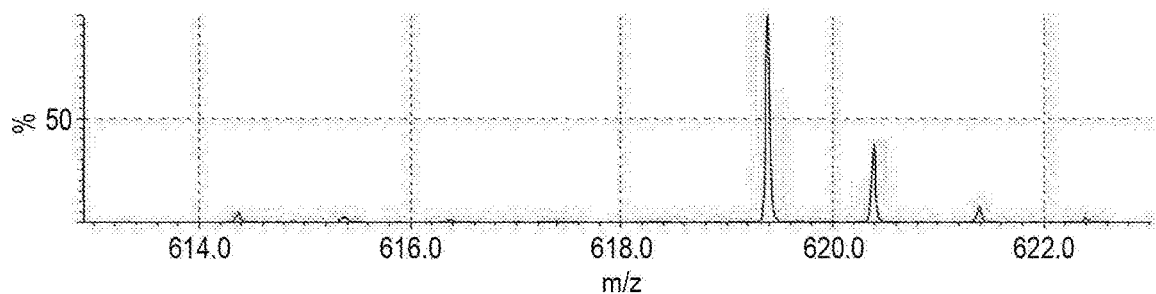
Figure 2E:
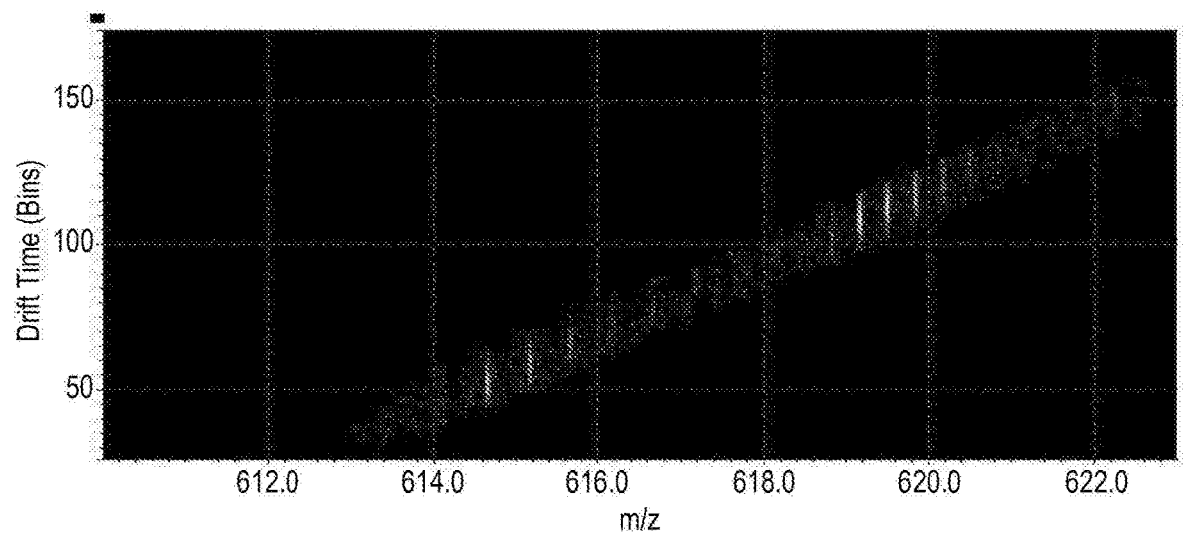
Figure 2F:
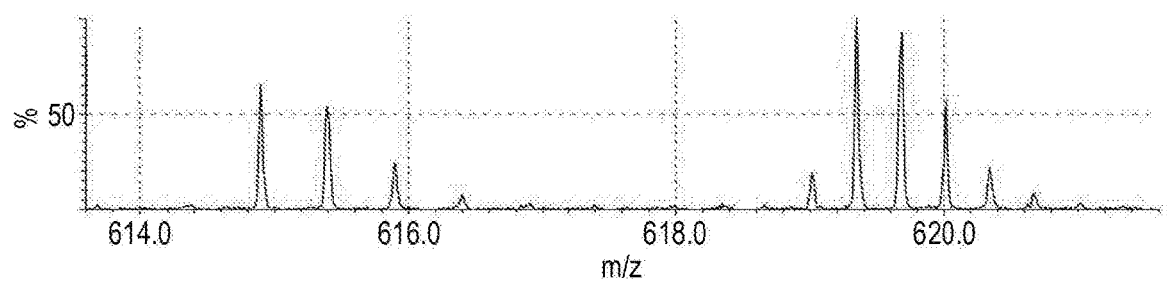

FIGS. 2C and 2D show the data of FIGS. 2A and 2B, respectively, for only the ions of relatively low charge state; whereas FIGS. 2E and 2F show the data of FIGS. 2A and 2B, respectively, for only the ions of relatively high charge state. As can be seen, this demonstrates that ions of different charge states (e.g. between m/z 619 and 621) that are unresolved by mass to charge ratio may be completely resolved due to the ion mobility separation. As the different charge states are well resolved by ion mobility, this suggests that using the mass filter 4 to introduce ions of each nominal mass to charge ratio over a period of ~6.25 ms does not significantly corrupt the ion mobility resolution of the device.

Figure 3:
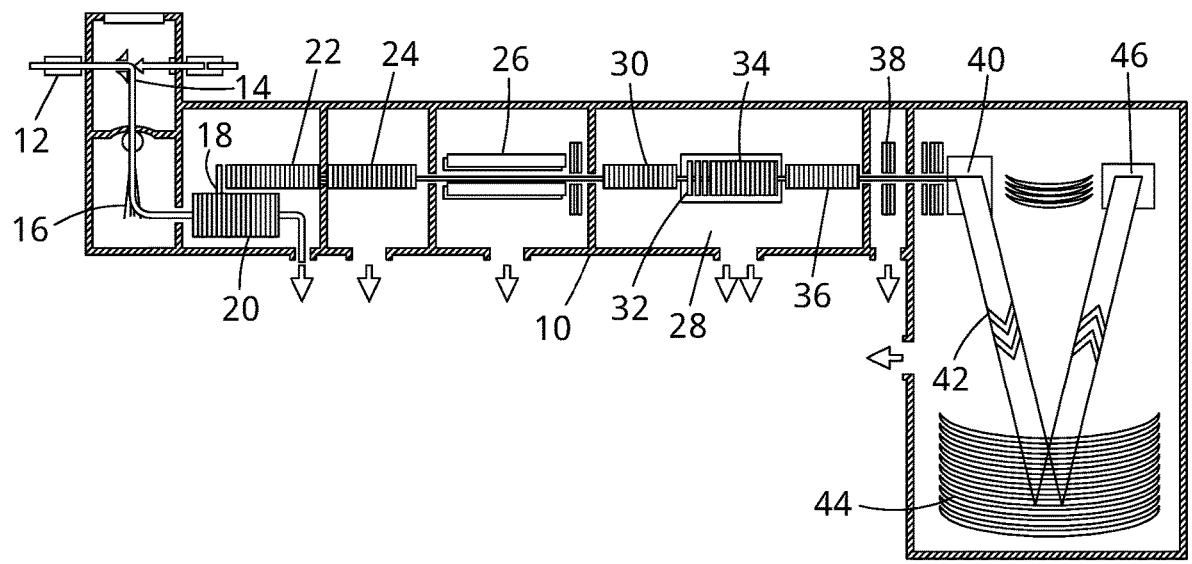
FIG. 3 shows a schematic of an instrument according to an embodiment of the present invention.

FIG. 3 shows a schematic of a Waters Synapt G2-Si Q-ToF instrument, which may be used to perform the methods described herein. The instrument may be operated by injecting a sample from a liquid chromatography separator into the instrument at the injection inlet 12. The sample is sprayed from a needle into the ionisation chamber 14. Ionisation of the sample occurs so as to form sample ions. The ionised sample passes out of the ionisation chamber and the ions flow towards a first vacuum region 16. The ions are transferred through the first vacuum region 16 and into an ion guide 18. The ion guide initially guides the ions along a section having a relatively large cross-sectional area 20 and then focusses the ions into a smaller cross-sectional area in an off-axis section 22. The ions are then transferred into a further ion guide 24 and into a quadrupole mass filter 26. Ions may, or may not, be fragmented in ion guide 18 and/or ion guide 24.

The quadrupole mass filter 26 is operated in the manner described above with respect to FIG. 1 so that different mass to charge ratios are transmitted at different times. The ions transmitted by the mass filter 26 pass into the downstream vacuum chamber 28. The ions then pass into cell 30, which is conventionally operated as an ion trap, but according to embodiments of the present invention may not axially trap ions, and may (or may not) be operated so as to fragment ions passing therethrough.

The ions are then transmitted into an ion mobility separator 34. In contrast to known techniques, the transmission of ions into the ion mobility separator 34 is controlled directly by the mass filter 26 and not by an ion trap pulsing ions into the ion mobility separator. The ions are temporally separated according to their ion mobility within the mobility separator 34, which may be operated as described above with respect to FIG. 1.

As the ions exit the ion mobility separator 34 they may be passed into a ToF pusher region 40 of an orthogonal acceleration ToF mass analyser (optionally via a transfer cell 36 and lenses 38). The pusher region 40 may be pulsed a plurality of times during each elution cycle of the ion mobility separator 34 (i.e. for each dwell time of the mass filter 26). As such, groups of ions having small ranges of ion mobility are pulsed into a flight tube 42 and reflectron 44, in which they are reflected to a detection system 46. The flight times of the ions from the pusher 40 to the detection system 46 are recorded and used to determine the mass to charge ratios of the ions in the normal manner. Also, the transit times of the ions through the ion mobility separator 34 (and hence optionally the ion mobilities of the ions) may be determined. This may be determined, for any given ion, from the duration between the time at which the mass filter 26 switched so as to be able to transmit that ion (or parent) to the time that the ion was detected at the detection system 46.

According to an embodiment, ions of Leucine Enkephalin m/z=556.3 were fragmented by collision induced dissociation in source ion guide 24. The resulting fragment ions were transmitted downstream to mass filter 26, which was controlled so as to scan its mass transmission window over a range from m/z=400 to m/z=650 in 0.1 seconds. The ions transmitted by the mass filter 26 were then fragmented by collision induced dissociation in cell 30 so as to produce second generation fragment ions. The resulting ions, which included second generation fragment ions and some unfragmented first generation ions, were then separated in the IMS device 34. Second generation fragment ions of relatively low mass to charge ratio, and hence relatively high ion mobility, travel through the IMS device 34 relatively quickly as compared to ions of relatively high mass to charge ratio and low ion mobility. Ion mobility separation of both the remaining first generation fragment ions and the second generation fragment ions occurs simultaneously.

Figure 4A:
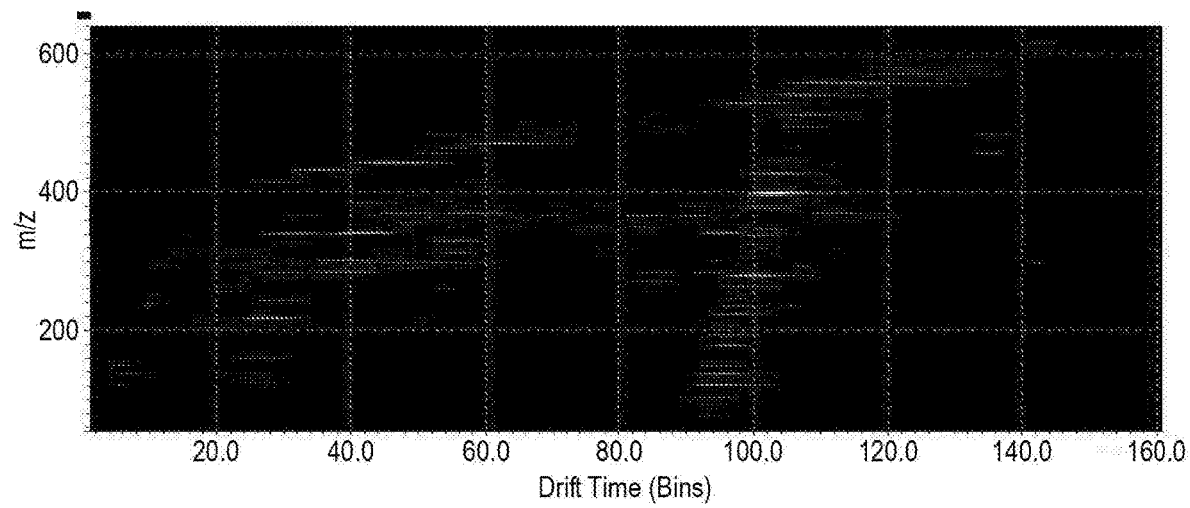
FIGS. 4A-4C show data obtained using the embodiment of FIG. 3.
Figure 4B:
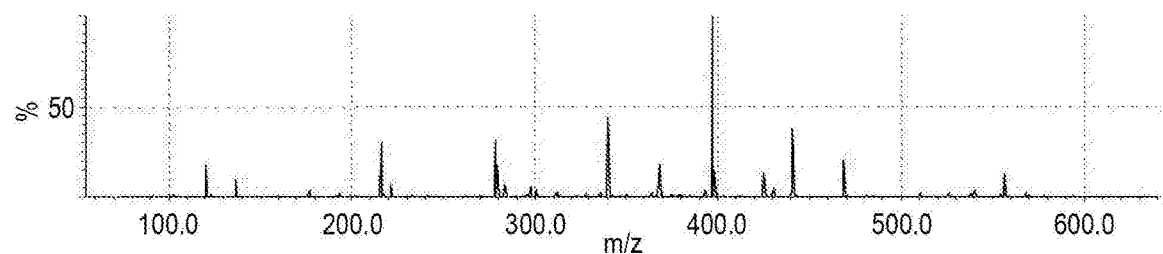
Figure 4C:
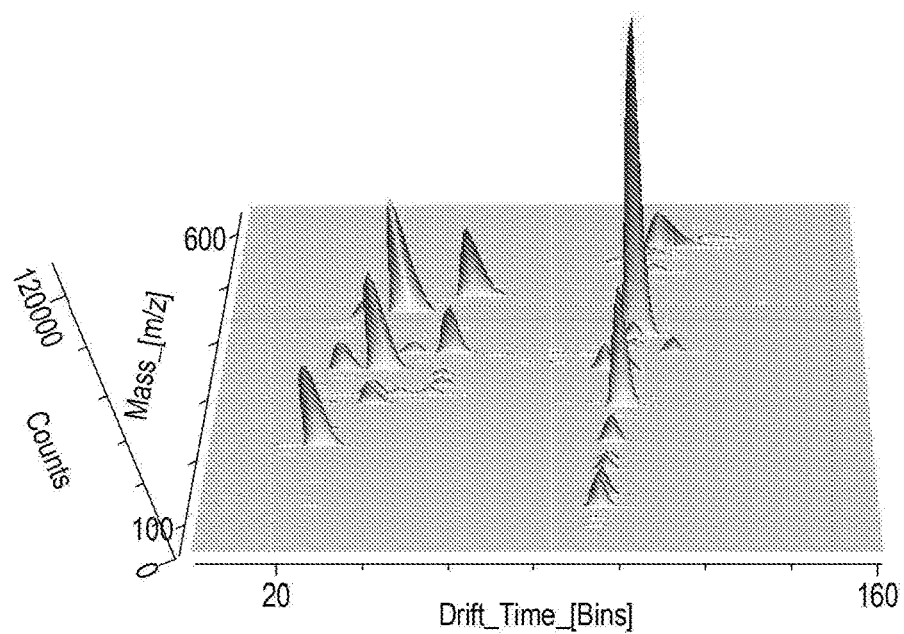

FIGS. 4A-4C show data obtained according to this embodiment. FIG. 4A shows a heat-map plot in which the y-axis represents mass to charge ratio (i.e. of the first generation fragment ions transmitted by the mass filter 26 and the second generation fragments generated in collision cell 30), the x-axis represents the drift times through the IMS device 34 of the ions detected by the TOF mass analyser, and the brightness of the points plotted represents the intensity of the ions detected (with brighter points representing more a more intense ion signal). The data points at the top of the plot in FIG. 4A follow a relatively shallow diagonal trend that increases in mass to charge ratio with drift time. These data points represent the first generation fragment ions that have been transmitted by the mass filter 26, but not been fragmented in the collision cell 30. It can be seen that a relatively steep diagonal trend of data points is associated with each of these first generation fragment ions. Each of these steeper trends corresponds to the second generation fragment ions derived from one of the first generation fragment ions. The second generation fragment ions are therefore able to be correlated to their respective first generation fragment ions.

FIG. 4B shows the intensity of the ion signal detected as a function of mass to charge ratio, for the data in FIG. 4A (without showing the drift time data for the ions). FIG. 4C shows a three dimension plot corresponding to FIG. 4A, except where the intensity of the detected ions is illustrated on the z-axis, rather than by the brightness of the points plotted as in FIG. 4A.

The collisional cross section values of both the first generation fragment ions that were selected by the quadrupole mass filter 26 and the second generation fragment ions formed prior to the IMS device 34 may be calculated from the drift times through the IMS device. In order to help calculate the collisional cross section values of the ions, two or more experiments may be performed under differing quadrupole mass filter scan conditions and/or different IMS device separation conditions. To give a simple example, suppose that two different quadrupole mass filter scans are used in two different experiments, and assume that the mass to charge ratio transmission window moves linearly with time for both scans. For any one of the experiments, the measured arrival time of an ion at the detector in the first scan could then be expressed as $$t_0 = a(m/z) + b + t_m(K) \quad (1)$$

where m/z is the mass to charge ratio of the ion, $t_m(K)$ is the transit time of the ion through the IMS device for an ion of mobility K, and a and b parameterise the linear scan of the mass filter. The function $t_m(K)$ may be known from first principles (e.g. if the IMS device is a drift tube IMS device having a static voltage gradient for driving ions along it) or may be calibrated (e.g. if the IMS device is a travelling wave IMS device).

Therefore, the measured arrival time for a first experiment may be expressed by equation 1, whereas the measured arrival time for the second experiment would be expressed by equation 2 below, as the values of a and b would be different:

$$t'_0 = a'(m/z) + b' + t_m(K) \quad (2)$$

Equations 1 and 2 above can be solved together to give the transit time through the IMS device for an ion of mobility K as:

$$t_m(K) = \frac{(a't_0 - at'_0) - (a'b - ab')}{a' - a} \quad (3)$$

From equation 3 it can be seen that the two scans are required to have different gradients (a'≠a).

The known function $t_m(K)$ may then be inverted (exactly or numerically) to find K. Similarly, the mass to charge ratio m/z of the ion is given by:

$$m/z = \frac{(t'_0 - t_0) - (b' - b)}{a' - a} \quad (4)$$

Figure 5:
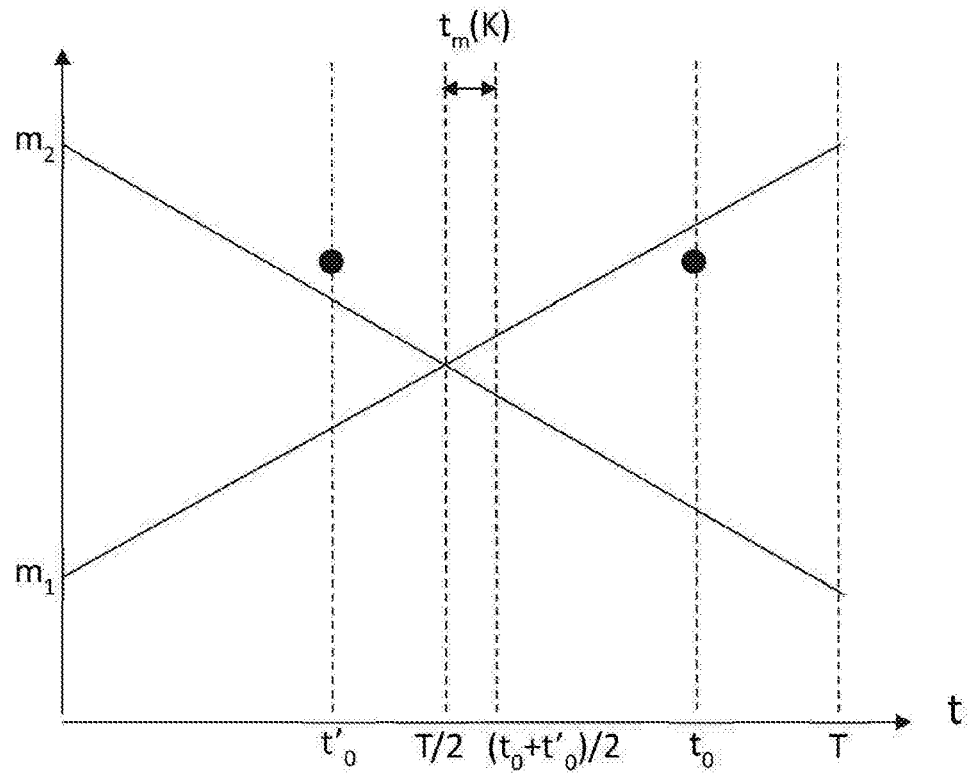
FIG. 5 shows plots of how a mass filter may be scanned in different experiments, according to an embodiment of the present invention.

FIG. 5 shows plots of how the mass filter 26 may be scanned in the two experiments, according to an embodiment of the present invention. In this embodiment, in the first experiment the mass to charge ratio transmission window of the mass filter 26 is scanned from mass to charge ratio $m_1$ to mass to charge ratio $m_2$ over a time period T. In the second experiment the mass to charge ratio transmission window of the mass filter is scanned in the reverse direction to the first experiment, i.e. the mass transmission window is scanned from mass to charge ratio $m_2$ to mass to charge ratio $m_1$ over a time period T. In this embodiment, the transit time through the IMS device for an ion of mobility K is given as:

$$t_m(K) = \frac{1}{2}(t_0 + t'_0) - \frac{1}{2}T$$

More generally, the quadrupole mass filter scans need not be linear and/or the transit time through the IMS device may have a dependence on mass to charge ratio. There may also be a known mass to charge ratio dependent delay and/or mobility K dependent delay between the ions leaving the IMS device and being detected at the detector. In these more general scenarios, the corresponding equations can be solved numerically. Uncertainties in time measurements may be propagated into uncertainties in mobility transit times and/or mobility K and mass to charge ratio measurements. The numerical approach can also be adapted to cases where more than two different quadrupole mass filter scans are adopted and/or more than two different IMS separations are performed under differing IMS device separation conditions (e.g. differing travelling wave settings in a travelling wave IMS device). Suitable numerical approaches include least squares fitting and Bayesian forward modelling approaches amongst many others.

In order to accurately calculate the collision cross section values of the ions, it may be useful to determine the transit times of the ions through the quadrupole mass filter and any downstream ion optics that is not due to separation in the IMS device. These mass to charge ratio dependent transit times can then be taken into account to more accurately calculate the collision cross section values. In order to do this, the transit times of the ions may be measured both with and without the IMS device being operational, e.g. by measuring the transit times in a first mode with the IMS background gas being at normal IMS operational pressure and then in a second mode with the IMS background gas being at a relatively low pressure such that ion mobility separation is negligible. The data from the two modes can then be compared to calculate the mass to charge ratio dependent transit times of the ions and factor those in to the collision cross section calculation.

Although the present invention has been described with reference to preferred embodiments, it will be understood by those skilled in the art that various changes in form and detail may be made without departing from the scope of the invention as set forth in the accompanying claims.

For example, although two linear quadrupole scans have been described in relation to FIG. 5, this may be replaced by a single mass filter scan that reverses direction one or more times (e.g. in a V-shape or W-shape), or repeatedly scans up and down between two mass to charge ratio values in a smooth manner (e.g. sinusoidally).

Although two stages of fragmentation or reaction have been described above, it is contemplated that a further step of fragmentation or reaction may be performed after separation in the IMS device in order to form third generation fragment ions. In embodiments in which the detected ions are fragment ions formed after the IMS device, equations 3 and 4 above give the mobility transit time and mass to charge ratio of the corresponding precursor ion. For example, in a first experiment second generation ions may be produced and detected, and then in a second experiment third generation ions may be produced and detected. The third generation product ions from the second experiment may be associated with the second generation fragment ions from the first experiment based on their times of detection, as the third generation ions were produced just before the detector and so will be detected at the same times as their corresponding second generation precursor ions.

The invention claimed is:

1. An instrument for analysing ions comprising:
   a first device configured to onwardly transmit ions having a restricted range of physicochemical property values at any given time, and to change said range with time such that the first device is capable of transmitting ions having different physicochemical property values at different times; and
   an ion mobility separator arranged to receive ions transmitted by the first device;

wherein the instrument is configured such that the time that any given ion enters the ion mobility separator and begins to be separated from other ions is defined by its time of transmission by the first device; and wherein the first device is configured to transmit each range of physicochemical property values for a time period before changing said range that is transmitted, wherein said time period is shorter than the transit time through the ion mobility separator of the highest mobility ion in said range.

2. The instrument of claim 1, configured such that ions are not axially trapped between the first device and the ion mobility separator.

3. The instrument of claim 1, wherein the first device is a mass filter and the physicochemical property is mass to charge ratio.

4. The instrument of claim 1, wherein the physicochemical property is mass to charge ratio and the first device is a mass selective ion trap.

5. The instrument of claim 1, wherein the physicochemical property is ion mobility or differential ion mobility.

6. The instrument of claim 1, comprising a mass analyser downstream of the ion mobility separator for mass analysing ions that have been separated by the ion mobility separator, or ions derived therefrom.

7. The instrument of claim 1, comprising an ion detector arranged downstream of the ion mobility separator; and wherein the instrument comprises a processor is configured to determine the transit time of any given ion through the ion mobility separator based on the time at which said restricted range of physicochemical property values is changed and the time at which said given ion, or an ion derived therefrom, is subsequently detected at the ion detector.

8. The instrument of claim 7, wherein the processor is configured to determine the ion mobility or collision cross section of said given ion from said transit time.

9. The instrument of claim 7, comprising a mass analyser downstream of the ion mobility separator for determining the mass to charge ratios of the ions it receives, wherein the processor is configured to record both the mass to charge ratio of each ion and also the transit time or ion mobility of that ion, or of the ion from which it is derived.

10. The instrument of claim 6, configured such that, in a first mode, precursor ions transmitted by the first device are substantially not fragmented or reacted between the first device and the mass analyser or ion detector such that substantially only the precursor ions are detected at the mass analyser or ion detector.

11. The instrument of claim 1, comprising a fragmentation or reaction device downstream of the ion mobility separator that is configured, in a second mode, to fragment or react at least some of the ions received from the ion mobility separator so as to form fragment or product ions.

12. The instrument of claim 1, comprising a fragmentation or reaction device between the first device and ion mobility separator that is configured, in a third mode, to fragment or react at least some of the precursor ions it receives from the first device so as to form first fragment or product ions.

13. A method of separating ions according to ion mobility comprising:

providing an instrument as claimed in claim 1;

controlling the first device so as to onwardly transmit ions having a restricted range of physicochemical property values at any given time; and separating ions that are transmitted by the first device in an ion mobility separator;

wherein the first device is controlled so that said range is changed with time such that the first device transmits ions having different physicochemical property values at different times; and wherein the time that any given ion enters the ion mobility separator and begins to be separated from other ions is defined by its time of transmission by the first device.

14. The method of claim 13, wherein precursor ions transmitted by the first device to the ion mobility separator are not axially trapped between the first device and the ion mobility separator.

15. The method of claim 13, comprising fragmenting or reacting at least some of the precursor ions transmitted by the first device to form fragment or product ions; and transmitting the fragment or product ions, and any remaining precursor ions, to the ion mobility separator without axially trapping any ions between the first device and the ion mobility separator.

16. A method of mass spectrometry comprising the method of claim 13, and mass analysing ions downstream of the ion mobility separator.

17. A method of ion mobility spectrometry comprising the method of claim 13, detecting ions downstream of the ion mobility separator and determining, from their times of detection, the ion mobilities of ions that were transmitted through the ion mobility separator.

18. An instrument for analysing ions comprising:

a first device configured to onwardly transmit ions having a restricted range of physicochemical property values at any given time, and to change said range with time such that the first device is capable of transmitting ions having different physicochemical property values at different times; and an ion mobility separator arranged to receive ions transmitted by the first device;

wherein the instrument is configured such that the time that any given ion enters the ion mobility separator and begins to be separated from other ions is defined by its time of transmission by the first device;

wherein the first device is a resolving quadrupole rod set mass filter or a notched mass filter; and wherein the physicochemical property is mass to charge ratio.

19. The instrument of claim 18, further comprising an ion detector arranged downstream of the ion mobility separator; and wherein the instrument comprises a processor configured to determine the transit time of any given ion through the ion mobility separator based on the time at which said restricted range of physicochemical property values is changed and the time at which said given ion, or an ion derived therefrom, is subsequently detected at the ion detector.

* * * * *